US010785512B2

(12) United States Patent
Kambhatla et al.

(10) Patent No.: US 10,785,512 B2
(45) Date of Patent: Sep. 22, 2020

(54) GENERALIZED LOW LATENCY USER INTERACTION WITH VIDEO ON A DIVERSITY OF TRANSPORTS

(71) Applicant: INTEL CORPORATION, Santa Clara, CA (US)

(72) Inventors: Srikanth Kambhatla, Portland, OR (US); Nausheen Ansari, Folsom, CA (US); Gary Smith, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 16/133,476

(22) Filed: Sep. 17, 2018

(65) Prior Publication Data

US 2019/0045236 A1   Feb. 7, 2019

(51) Int. Cl.
| | |
|---|---|
| *H04N 19/172* | (2014.01) |
| *H04N 19/16* | (2014.01) |
| *H04N 21/2365* | (2011.01) |
| *H04N 21/236* | (2011.01) |
| *H04N 21/462* | (2011.01) |
| *G09G 5/00* | (2006.01) |
| *G09G 5/14* | (2006.01) |
| *G09G 5/377* | (2006.01) |
| *H04N 21/431* | (2011.01) |

(52) U.S. Cl.
CPC .......... *H04N 21/2365* (2013.01); *G09G 5/00* (2013.01); *G09G 5/006* (2013.01); *G09G 5/14* (2013.01); *G09G 5/377* (2013.01); *H04N 21/23614* (2013.01); *H04N 21/4622* (2013.01); *H04N 19/172* (2014.11); *H04N 21/4316* (2013.01)

(58) Field of Classification Search
None
See application file for complete search history.

(56) References Cited

U.S. PATENT DOCUMENTS

| | | | |
|---|---|---|---|
| 2017/0171494 A1* | 6/2017 | Rabii | H04N 21/4122 |
| 2017/0287215 A1* | 10/2017 | Lalonde | G06T 19/006 |
| 2018/0246635 A1* | 8/2018 | Baer | G06F 3/0481 |
| 2018/0349297 A1* | 12/2018 | Wilson | G06F 13/107 |

* cited by examiner

*Primary Examiner* — Dave Czekaj
*Assistant Examiner* — Samuel D Fereja
(74) *Attorney, Agent, or Firm* — Green, Howard, & Mughal LLP

(57) ABSTRACT

Techniques related to providing video on a variety of transports are discussed. Such techniques include transmitting and receiving separate first and second video streams such that a first video stream includes a base frame of composed video content and the second video stream includes a user interaction frame of user interaction content and, after receiving the video streams, combining the base frame and the user interaction frame to generate a composite frame for presentment by a display.

25 Claims, 8 Drawing Sheets

GENERALIZED LOW LATENCY USER INTERACTION WITH VIDEO ON A DIVERSITY OF TRANSPORTS

BACKGROUND

Display interfaces provide for the transmission of audio and/or video from a source device to a display device. Display interfaces include, for example, High-Definition Multimedia Interface (HDMI), DisplayPort (DP), embedded DisplayPort (eDP), and Mobile Industry Processor Interface (MIPI) display serial interface (DSI). HDMI, a digital replacement for analog video standards, is a proprietary audio and video interface for transmitting uncompressed video data and compressed or uncompressed digital audio data from an HDMI-compliant source device, such as a display controller, to a compatible display device. DP is a digital display interface that is standardized by the Video Electronics Standards Association (VESA) and provides an interface to connect a video source to a display device and to carry audio and other forms of data. DP was designed to replace Video Graphics Array (VGA) and Digital Visual Interface (DVI). The DP interface is backward compatible with other interfaces, such as HDMI and DVI. eDP defines a standardized display panel interface for internal connections such as connections between graphics cards to notebook display panels. MIPI DSI defines a high-speed serial interface between a host processor and a display module to provide integrated displays with high performance. MIPI DSI is commonly used for displays in smartphones, tablets, laptops and vehicles.

It may be advantageous to improve display interfaces to support diverse transports to reduce the number of video streaming protocols that need to be implemented in a source device. It is with respect to these and other considerations that the present improvements have been needed. Such improvements may become critical as the desire to display video and audio data in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
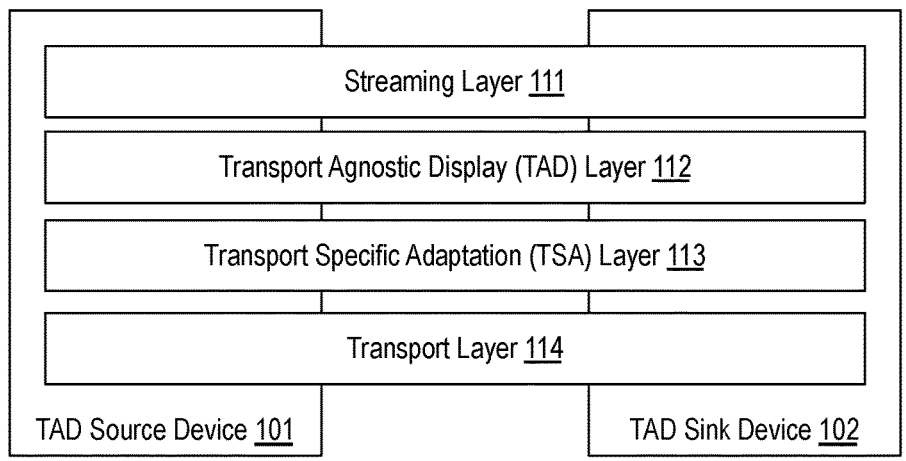
FIG. 1 illustrates an example transport agnostic display protocol end-to-end layering of devices.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM);

magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to communicating video data over diverse transports and, in particular, to generalized low latency user interaction with video in a transport agnostic display context.

As described above, display interfaces provide for the transmission of audio and/or video from a source device to a display device. Transport agnostic display (TAD) is a video streaming and control protocol that can be adapted to run on diverse transports such USB, 802.11, and Ethernet, and can also be adapted to interface with monitors implementing legacy protocols such as DisplayPort or HDMI. TAD offers the advantages of reducing the number of video streaming protocols that need to be implemented in a video source device and decouples content refresh rate from presentation refresh rate to provide energy efficiency for emerging high resolutions and higher refresh rates.

In some embodiments, composed video content and user interaction video content are decoupled. A video source device generates a first video stream corresponding to a first video plane that includes base frames of composed video content. As used herein, the term composed video content indicates any video content to be presented to a user such as video content, entertainment content, graphics content, user workspace content, etc. The composed video content is obtained by composing individual video planes. In one embodiment, a video plane consisting of a cursor is composed with other video planes to generate the final composed video content. In this case, the composition of all the video planes but for the cursor are referred to as the base frame. By definition, it indicates a frame that is sized to fit a display screen. The base frame may be at any suitable display resolution such as HD, 2K, UHD, 4K, etc. In some embodiments, the base frames are for presentment at a particular frame rate. The video source device also generates a second video stream, separate from the first video stream, corresponding to a second video plane, that includes a user interaction frame of user interaction content. For example, the user interaction content as provided by the second video stream and video plane may provide a cursor or any other moveable indicator that identifies a location on a screen that will be affected by input from the user via a user input device. The video source device separately transmits the first and second video streams. A display device receives the first and second video streams and combines a base frame and a user interaction frame to generate a composite frame, which is presented to a user via a display screen of the display device.

In particular, in the implementation of TAD, there is the potential for user experience issues resulting from delays introduced in the encoder, the decoder, and in the transport/adaptation layers. For example, when a user is interacting with a video sink device (e.g., the user is providing inputs thru a joystick, game controller, gamepad, mouse pad, remote, etc.), misalignment between natural human response and the result of end-to-end delay may cause button presses to be captured in incorrect places, which impacts the correctness of resulting action, poor timeliness and response of control, and user frustration. The techniques discussed herein resolve or mitigate such problems by transmitting the user interaction content (e.g., a cursor) and a base frame separately and composing the content into a frame for presentment at the video sink. In addition, for subsequent user interaction content changes that affect, for example, location but not shape (e.g., any change that does not require updating pixel data) the user interaction content may be updated using a user interaction content update message (e.g., a cursor metadata packet) in a data plane or a control plane, separate from the video streams and planes, with the user interaction content update message providing a location update, composition parameter updates, etc. such that the user interface content may be updated in the base frame without receiving another user interaction frame. Such techniques avoid composing an entire resultant frame (a final frame for presentment) at the video source, transmitting the resultant frame, and processing it at a video sink with respect to a change that is only to the user interface content (e.g., a cursor creation or move). The corresponding bandwidth usage and end-to-end latency for encode, decode, transport, post-processing, etc. is thereby reduced.

In an embodiment, the capabilities of TAD are extended to provide for the creation of two instances of a TAD link (each transmitting and receiving a single video stream) from a given stream source to a specific stream sink, with one instance being dedicated to user interaction content (e.g., a cursor) and the other instance dedicated to a base frame. Furthermore, the capabilities of TAD are extended to provide mechanisms to bind and unbind these instances dynamically. Individual frames from the bound instances are combined in the video sink device for presentation. In addition or in the alternative, the capabilities of TAD are extended to transmit multiple individual planes (e.g., video planes) to be transmitted from a given video source device to a given video sink device. The user interface content is transmitted as one of the planes and the base frame content is transmitted as another of the planes. The video sink device combines the separate planes for presentation. Such combining may be performed using any suitable technique or techniques such as overlay techniques, composition techniques, blending techniques, etc. as are known in the art. Such techniques provide for low latency, energy efficiency, and support on a diversity of transports. Furthermore, these benefits will only be amplified as resolution and refresh rate inevitably increase.

FIG. 1 illustrates an example transport agnostic display protocol end-to-end layering 100 of devices, arranged in accordance with at least some implementations of the present disclosure. As shown in FIG. 1, transport agnostic display (TAD) protocol end-to-end layering 100 includes a TAD source device 101 and a TAD sink device 102. TAD protocol end-to-end layering 100 includes a streaming layer 111, a TAD display layer 112, a transport specific adaptation (TSA) layer 113, and a transport layer 114. In an embodiment, streaming layer 111 originates, manages, and terminates video stream(s) between TAD source device 101 and TAD sink device 102. In an embodiment, TAD layer 112 configures, manages, packetizes, and encrypts (and provides complementary decryption, de-packetization, etc.) each TAD video stream between TAD source device 101 and TAD sink device 102. In an embodiment, TSA layer 113 adapts a transport agnostic video stream to a specific transport, as needed. In an embodiment, transport layer 114 provides a physical bus that carries TAD video stream(s) between TAD source device 101 and TAD sink device 102. Furthermore, transport layer 114 may include physical transmitters and receivers for communication of TAD video stream(s).

In some embodiments, TAD source device 101 is physically separate (and provided in a separate housing and/or form factor) with respect to TAD sink device 102. In other embodiments, TAD source device 101 can be integrated with TAD sink device 102. TAD source device 101 and/or TAD sink device 102 may be implemented via any suitable device or form factor such as, for example, a personal computer, a laptop computer, a tablet, a phablet, a smart phone, a gaming console, a wearable device, a television, a monitor, a display screen, etc.

Figure 2:
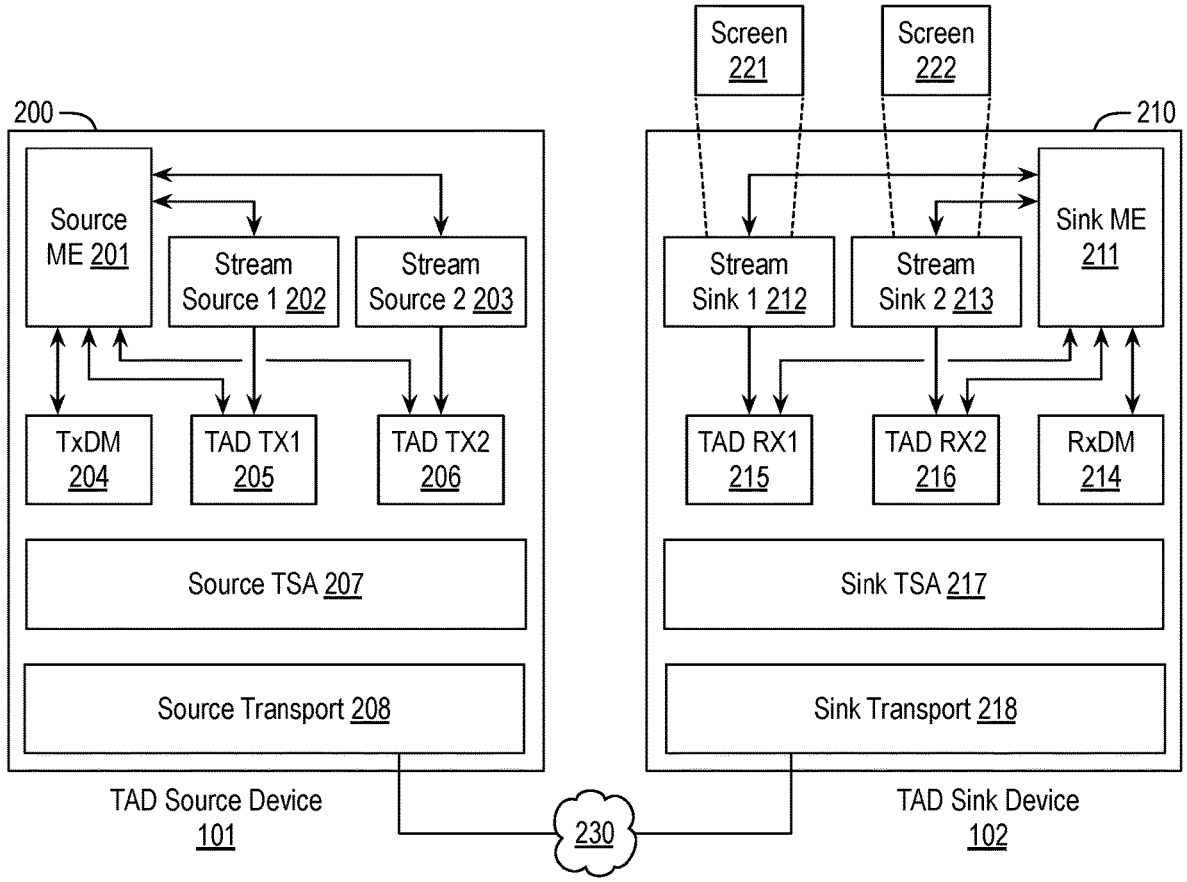
FIG. 2 illustrates an example TAD source device coupled to an example TAD sink device over an example transport topology.

FIG. 2 illustrates an example TAD source device 101 coupled to an example TAD sink device 102 over an example transport topology 230, arranged in accordance with at least some implementations of the present disclosure. As shown in FIG. 2, TAD source device 101 (or at least some components thereof) is implemented via a controller 200. TAD source device 101 includes a source management entity (ME) 201, a video stream source 1 202, a video stream source 2 203, a TAD device manager (TxDM) 204, a TAD transmitter 1 (TAD TX1) 205, a TAD transmitter 2 (TAD TX2) 206, a source TSA module 207, and a source transport module 208. Controller 200 may be implemented via any suitable processor(s), firmware, software, etc. as is discussed further herein. Furthermore, TAD sink device 102 (or at least some components thereof) is implemented via a controller 210 and includes a sink management entity (ME) 211, a video stream sink 1 212, a video stream sink 2 213, a TAD device manager (RxDM) 214, a TAD receiver 1 (TAD RX1) 215, a TAD receiver 2 (TAD RX2) 216, a sink TSA module 217, and a sink transport module 218. Controller 210 may be implemented via any suitable processor(s), firmware, software, etc. as is discussed further herein. In an embodiment, video stream sink 1 212 and video stream sink 2 213 present video frames to a user. For example, video stream sink 1 212 and video stream sink 2 213 may each include a display screen separate from controller 210. The display screens may be integral to TAD sink device 102 or separate therefrom and communicably coupled via a wired or wireless link.

In an embodiment, TAD defines a framework to transmit and receive video content such that the transmit and receive is agnostic to the transport implemented by transport topology 230. For example, transport topology 230 may include one or more of a legacy wired transport for video streaming, a legacy wireless transport or a non-traditional transport for video, wherein the legacy wired transport includes Universal Serial Bus (USB), the legacy wireless transport includes Institute of Electrical and Electronics Engineers (IEEE) 802.11, and the non-traditional transport includes Ethernet. Furthermore, transport topology 230 may include a direct connection between TAD source device 101 and TAD sink device 102 or any number of intervening devices between TAD source device 101 and TAD sink device 102.

As used herein, the terms TAD source device, TAD source, or video source device (e.g., TAD source device 101) indicate any device that originates a video stream. For example, as discussed, TAD source device 101 may be a personal computer, a game console, a smart phone, etc. The terms TAD sink device, TAD sink, or video sink device (e.g., TAD sink device 102) indicate any device that terminates a video stream. For example, as discussed, TAD sink device 102 may be a television, a monitor, etc. The term TAD TX (e.g., TAD transmitter such as TAD TX, TAD TX1, TAD TX2) indicates an entity in a TAD source device that is responsible for encryption, TAD packetization, stream level capability discovery, control, and configuration. The term TAD RX (e.g., TAD receiver such as TAD RX, TAD RX1, TAD RX2) indicates an entity in a TAD sink device that is responsible for decryption, re-assembly of TAD packets, and responding to stream level capability, control, and configuration requests from a TAD source device. The term stream source indicates a logical entity in a TAD source device that originates a video stream. The term stream sink indicates a logical entity in a TAD sink device that terminates a video stream. The term video indicates a sequence of individual frames that are to be displayed to the end user. The term plane indicates a subset of a frame (a plane may be an entire frame) such that there may be multiple planes in a frame and a frame is a combination of all the planes. The term base frame indicates a frame including final composed content except for, for example, user interface content (e.g., a cursor) such that, when user interface content (e.g., a cursor) is not being displayed, a base frame is the same as a frame. The terms user interface content and user interaction content are used interchangeably and indicate content that provides a location for user input to a device (e.g., a cursor).

Figure 3:
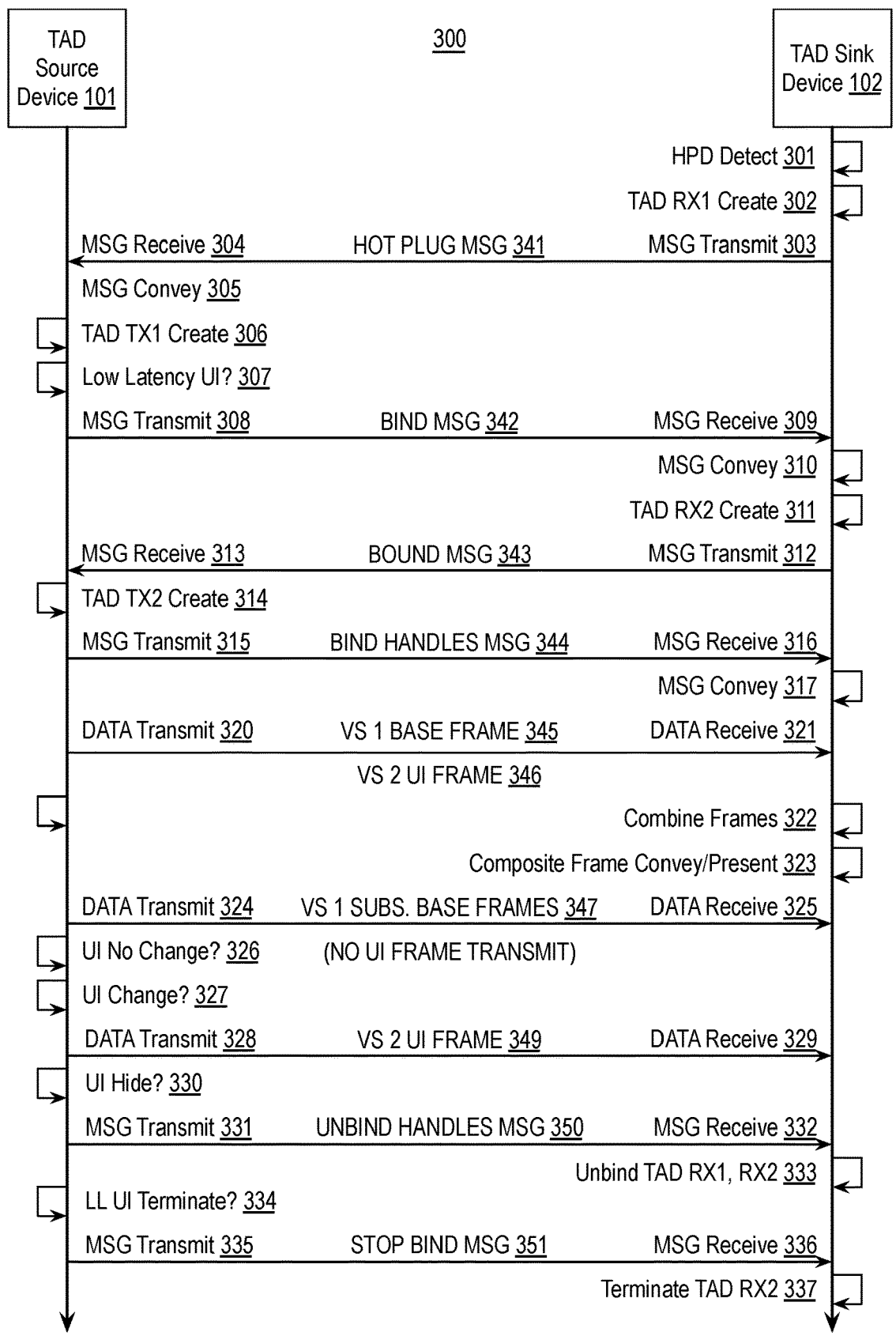
FIG. 3 illustrates an example process for transmitting and receiving separate video streams for base content and user interaction content.

FIG. 3 illustrates an example process 300 for transmitting and receiving separate video streams for base content and user interaction content, arranged in accordance with at least some implementations of the present disclosure. As shown in FIG. 3, TAD source device 101 and TAD sink device 102 interact to present video content to a user. In the discussion of FIG. 3, reference is made to TAD source device 101 coupled to an example TAD sink device 102 and the components thereof to indicate the sub-components of controllers 200, 210 that perform the discussed operations. In particular, FIG. 3 is discussed with reference to FIG. 4.

Figure 4:
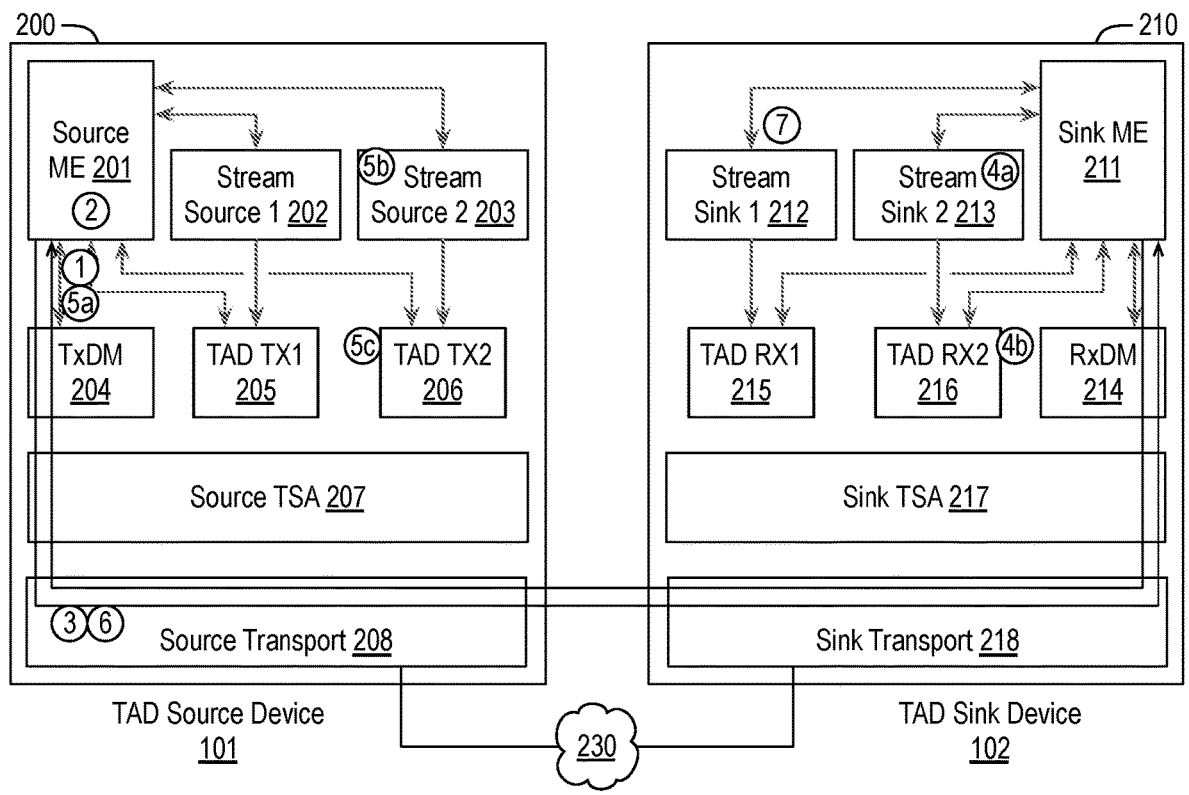
FIG. 4 illustrates an example TAD source device, an example TAD sink device, and exemplary operations made by sub-components thereof.

FIG. 4 illustrates example TAD source device 101, example TAD sink device 102, and exemplary operations made by sub-components thereof, arranged in accordance with at least some implementations of the present disclosure. For example, FIG. 4 illustrates the components of FIG. 2 with interconnections greyed out to illustrate messaging between TAD source device 101 and TAD sink device 102. For example, in the techniques discussed with respect to FIGS. 3 and 4, each video stream source of multiple video stream sources transmits one plane of a frame having multiple planes to a corresponding stream sink. For example, stream source 1 transmits video stream 1 to stream sink 1, stream source 2 transmits video stream 2 to stream sink 2, stream source 1 transmits video stream 3 to stream sink 3, and so on. For example, although illustrated with respect to two stream sinks, stream sources, TAD transmitters, and TAD receivers, any number of such components may be implemented by TAD source device 101 and TAD sink device 102. The number of planes supported (e.g., to be combined into a resultant frame) matches the number of stream sinks that are bound together. To support user interaction content, one of the video streams is dedicated to user interaction content (e.g., a cursor). To support combining video streams from different planes into composite frames, binding is performed through TAD control messages initiated by the source management entity (e.g., source ME 201), which is aware of all the stream sinks that have been enumerated and all the video streams initiated by stream sources. An exemplary sequence of operations is as follows.

Returning to FIG. 3, as shown, TAD sink device 102 may detect a hot plug device at operation 301. Such a hot plug detect (HPD) may be made at TAD sink device 102 using any suitable technique or techniques. As shown, in response to the HPD (or any other event to instantiate video display), TAD sink device 102 (e.g., via sink ME 211 and/or RxDM 214) creates a TAD RX (e.g., TAD RX 1 215) at operation 302. Furthermore, TAD sink device 102 (e.g., via sink ME 211) generates a hot plug message 341, which is transmitted by RxDM 214 to TAD source device 101 at operation 303. Hot plug message 341 includes an indication of a capable stream sink.

TAD source device 101 receives hot plug message 341 at operation 304 via TxDM 204. TxDM 204 conveys hot plug message 341 to source ME 201. In response thereto, TAD source device 101 (e.g., via source ME 201) generates a TAD TX (e.g., TAD TX1 205) at operation 306 as shown in FIG. 4 with respect to item (1) (e.g., as illustrated by a 1 enclosed in a circle).

At operation 307, TAD source device 101 (e.g., via source ME 201) determines whether low latency user interaction (UI) is being implemented. Such a determination may be made using any suitable technique or techniques. In some embodiments, the determination of low latency UI being enabled is made through a control panel interface (e.g., to control hardware), a control panel applet, or a custom control application. In an embodiment, the determination of low latency UI being enabled is built into the implementation of source ME 201 such that the default value may be customizable. Determination of whether low latency UI is implemented is illustrated in FIG. 4 with respect to item (2).

When low latency UI is being implemented, processing continues with source ME 201 generating a bind low latency UI message 342 and TAD source device 101 (e.g., via TxDM 204) transmitting bind low latency UI message 342 to TAD sink device 102, which receives bind low latency UI message 342 (e.g., via RxDM 214) at operation 309. Bind low latency UI message 342 includes a handle for TAD RX1 215 and other data to indicate the eventual combination of video planes as discussed herein. As used herein, the term handle indicates any indicator(s), labels, or the like that identify a component or logical entity. For example, a handle may identify a TAD RX (e.g., TAD RX 1 215, TAD RX2 216, etc.), a stream sink (e.g., stream sink 1 212, stream sink 2 213, etc.), an RX device manager (e.g., RxDM 214). In some embodiments, handles are integers that have values that are greater than or equal to zero. In an embodiment, bind low latency UI message 342 is characterized as a BindLowLatencyCursor control message. At operation 310, RxDM 214 conveys bind low latency UI message 342 to sink ME 211. The transmission of bind low latency UI message 342 is illustrated in FIG. 4 with respect to item (3).

In response to receiving bind low latency UI message 342, sink ME 211 creates an additional stream sink (e.g., stream sink 2 213) and an additional TAD RX (e.g., TAD RX 2 216) at operation 311. Furthermore, sink ME 211 assigns a handle to the additional TAD RX (e.g., TAD RX 2 216). Generation of the additional stream sink and TAD RX are illustrated in FIG. 4 with respect to items (4a) and (4b). RxDM 214 then generates a user interaction bound message 343, which contains the handles of TAD RX 1 215 and TAD RX2. In an embodiment, bind low latency UI message 342 is characterized as a BoundLowLatencyCursor notification message. As shown in FIG. 3, user interaction bound message 343 is transmitted by RxDM 214 at operation 312 and received by TAD source device 101 (e.g., via TxDM 204) at operation 313. The transmission of user interaction bound message 343 is illustrated in FIG. 4 with respect to item (5a).

In response to receiving user interaction bound message 343, source ME 201 creates an additional stream source (e.g., stream source 2 203) and an additional TAD TX (e.g., TAD TX 2 206) at operation 314. Generation of the additional stream source and TAD TX are illustrated in FIG. 4 with respect to items (5b) and (5c). Furthermore, source ME 201 generates a bind handles message 344 that includes the handles of TAD RX 1 215 and TAD RX2. Bind handles message 344 may also include handles of TAD TX1 205 and TAD TX2 206. Bind handles message 344 is transmitted via TxDM 204 at operation 315 to RxDM 214 of TAD sink device 102, which receives handles message 344 at operation 316. The transmission of bind handles message 344 is illustrated in FIG. 4 with respect to item (6). As shown, RxDM 214 conveys handles message 344 to sink ME 211 at operation 317.

As shown at operation 320, TAD source device 101 initiates data transmission of a video stream 1 including base frames 345 and, separately, of video stream 2 including user interaction frames 346. That is, video stream 1 including base frames 345 includes video data of a first plane that includes base frames and video stream 2 including user interaction frames 346 includes video data of a second plane that includes user interaction content. As used herein, the term separate with respect to video streams, video planes, and video frames indicates that each is capable of being processed, transmitted, received, encoded, decoded, etc. to generate video. For example, each of video stream 1 including base frames 345 and video stream 2 including user interaction frames 346 includes data that is separately capable of generating video for presentment to a user. In the embodiment of FIG. 3, video stream 1 including base frames 345 and video stream 2 including user interaction frames 346 are each generated by separate stream sources (stream source 1 202 and stream source 2 203). In an embodiment, video stream 1 including base frames 345 is encoded to generate a bitstream and TAD TX1 205 encrypts and packetizes the bitstream for transport. In an embodiment, video stream 2 including user interaction frames 346 is encoded to generate a bitstream and TAD TX2 206 encrypts and packetizes the bitstream for transport.

At operation 321, video stream 1 including base frames 345 and video stream 2 including user interaction frames 346 are received by TAD sink device 102. In particular, TAD RX1 215 receives video stream 1 including base frames 345 and TAD RX2 216 receives video stream 2 including user interaction frames 346. TAD RX1 215 decrypts and reassembles TAD packets to generate a bitstream that is decoded to generate base frames. Similarly, TAD RX2 216 decrypts and reassembles TAD packets to generate a bitstream that is to generate user interaction frames. A base frame and a user interaction frame are then combined at operation 322 to generate a composite frame. The composite frame is conveyed to stream sink 1 212 for presentation via a display screen at operation 323.

Figure 5:
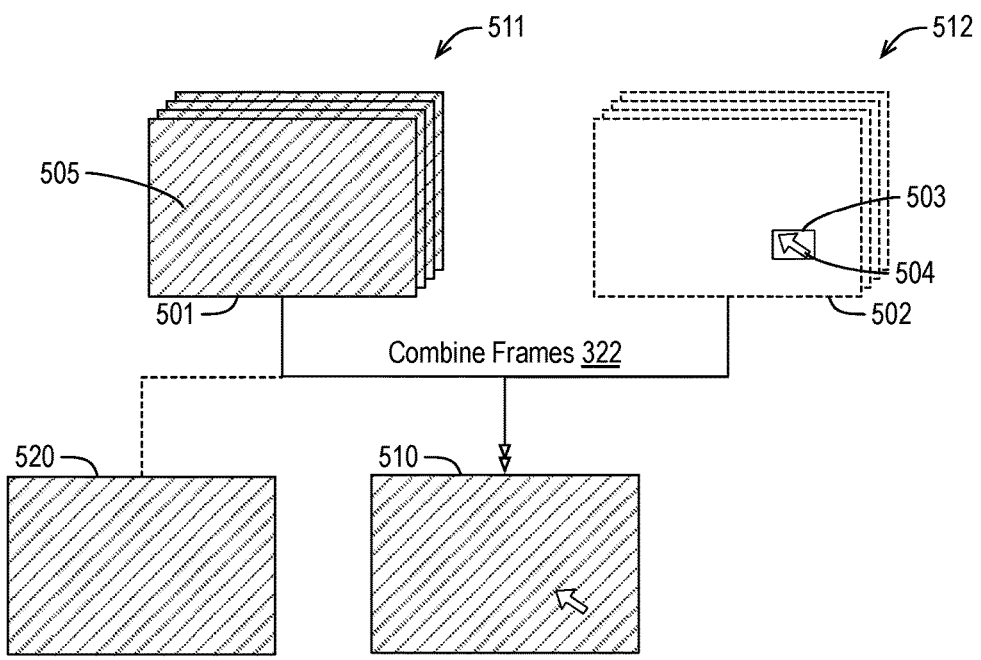
FIG. 5 illustrates an example combining of a base frame and a user interaction frame.

FIG. 5 illustrates an example combining 500 of a base frame and a user interaction frame, arranged in accordance with at least some implementations of the present disclosure. As shown in FIG. 5, base frame video 511, as decoded from video stream 1 including base frames 345 includes a sequence of base frames including base frame 501. Base frame 501 includes composed content 505, which may fill a display and includes any suitable content such as entertainment content, rendered content, office productivity content, and so on. Also as shown, user interaction video 512, as decoded from video stream 2 including user interaction frames 346 includes a sequence of user interaction frames including user interaction frame 502. User interaction frame 502 includes user interaction content 503 including a region 503 that includes a user interaction symbol 504 (e.g., a cursor), which may not fill a display and instead is within a relatively small region 503 such as a 16×16 pixel region, a 32×32 pixel region, a 64×64 pixel region, etc. It is noted that although user interaction frame 502 is illustrated to include a full frame size, for the sake of clarity of presentation, user interaction frame 502 may include only region 503.

As shown, at combine frames operation 322, base frame 501 and user interaction frame 502 are combined to generate a composite frame 510 that includes composed content 505 and interaction content 503 including user interaction symbol 504. Base frame 501 and user interaction frame 502 may be combined using any suitable technique or techniques such as overlay techniques, composition techniques, etc. Notably, although illustrated as having the same frequency or timing in FIG. 5, base frame video 511 and user interaction video 512 may include updated frames at any frequency and need not have the same frequency such that frames of base frame video 511 and user interaction video 512 may be updated in any suitable manner. In an embodiment, both base frame video 511 and user interaction video 512 include frames that are only updated when a change in the frames occurs. For example, if no change is indicated, the last frame, as held by a buffer for example, may be presented to the user. If one of base frame video 511 or user interaction video 512 changes, the corresponding frame may be received and recombined with the complementary frame. For example, if base frame video 511 changes, an updated base frame is transmitted by TAD source device 101 and received by TAD sink device 102, combined at TAD sink device with the previous user interaction frame and presented to the user. If user interaction video 512 changes, an updated user interaction frame is transmitted by TAD source device 101 and received by TAD sink device 102, combined at TAD sink device with the base frame and presented to the user. In an embodiment, base frame video may be provided at a preset frame and user interaction video 512 is updated only as needed. Such concepts are discussed further herein with respect to FIGS. 8 and 9.

Furthermore, FIG. 5 illustrates that, when no combining is to be performed, a base frame 520, which consists of base frame 501 or base frame 501 combined with other video frame(s), may be provided to another stream sink and display. For example, when a combined desktop or other work space, entertainment space, etc. is to be presented to a user across multiple displays, user interaction video 512 is only presented in one display screen. For example, composite frame 510 may be presented to a user via stream sink 1 212 and base frame 520, or base frame 501 may be presented to the user via stream sink 2 213 such that only one instance of user interaction symbol 504 is viewed by the user. Alternatively, when a cloned desktop or other work space, entertainment space, etc. is to be presented to a user across multiple displays, user interaction video 512 presented in both display screens. For example, composite frame 510 may be presented to a user via stream sink 1 212 and to, for example, another user, via stream sink 2 213 such that two instances of user interaction symbol 504 are viewed by the user in the cloned environment.

Returning to FIG. 3, the discussed example of subsequent base frame video being transmitted at operation 324 while no user interaction frames are provided as illustrated with respect to operation 326 due to no user interaction change being received (e.g., no user input was received), where TAD source device 101 initiates data transmission of video stream 1 including base frames 347 of the first plane without transmitting user interaction frames. At operation 325, video stream 1 including base frames 347 is received at TAD sink device 102. The received video stream 1 including base frames 347 is decrypted, reassembled to TAD packets, and decoded to generate a base frame that is combined with a previously generated user interaction frame to generate a composite fame, which is presented to a user as discussed. As will be appreciated, similar techniques may be used to update only user interaction frames and such techniques may be extended to update base frames and user interaction frames as needed.

As shown, when a user interaction change is detected at operation 327, a new user interaction frame is provided in video stream 2 including user interaction frame 349, which is transmitted as shown at operation 328 and received at operation 329. The user interaction frame is processed as discussed herein and combined with a complimentary base frame for presentation to a user.

At operation 330, when a determination is made that the user interaction content is to be hidden (e.g., as part of routine operation), source ME 201 generates and TxDM 204 transmits a suspend bind message 350 at operation 331. Suspend bind message 350, which also may be characterized as an unbind handles message or a SuspendCursorBinding control message or the like, is received by RxDM 214 at operation 232 and suspend bind message 350 includes the handle values of TAD RX1 215 and TAD RX2 216, which were bound to each other previously, and an instruction to unbind the handles. In response thereto, sink ME 211 suspends binding the two planes (e.g., the base frame video plane and the user interaction plane) at operation 333 before displaying the resultant image (e.g., from TAD TX1) onto a display screen via stream sink 1 212. That is, only the base frame (without combining a user interaction frame) is presented to the user. Notably, TAD sink device 102 does not terminate TAD RX2 216 in response to suspend bind message 350. After suspend bind message 350 has been received by RxDM 214, TAD TX1 205, and, in some embodiments, even TAD TX2 206 keep transmitting their respective video streams. The consequence of suspend bind message 350 is that sink ME 211 no longer composes the two video streams and only presents (e.g., provides for display) the base video frames received at TAD RX1 215. In an embodiment, suspend bind message 350 also indicates the video stream to be presented via a handle value in suspend bind message 350 (e.g., the video stream to be presented may be any of the video streams that were bound together previously). The binding may be resumed in a similar manner (not shown) by source ME 201 generating and TxDM 204 transmitting a restart bind message. The restart bind message, which may be characterized as a RestartCursorBinding control message, includes the handle values for TAD RX1 215 and TAD RX2 216 and an instruction to bind the handles. As noted above, the restart of binding does not include a generation of TAD RX2 216 as TAD RX2 216 was not terminated. Subsequently the base frame video plane and the user interaction plane are bound and processed as discussed above to provide composite video frames for presentment.

At operation 334, when low latency user interaction (LL UI) mode is to be terminated, source ME 201 generates and TxDM 204 transmits a stop bind message 351 at operation 335. Stop bind message 351, which also may be characterized as a StopCursorBinding control message or the like, is received by RxDM 214 at operation 236 and stop bind message 351 includes the handle values of TAD RX1 215 and TAD RX2 216, which were bound to each other previously, and an instruction to stop binding the handles. In response thereto, sink ME 211 stops binding the two planes (e.g., the base frame video plane and the user interaction plane) before displaying the resultant image (e.g., from TAD TX1) onto a display screen via stream sink 1 212 and terminates TAD RX2 216 at operation 337. Notably, reception of stop bind message 351 causes sink ME 211 to destroy TAD RX2 216.

Although illustrated in a particular order for the sake of clarity of presentation, the discussed techniques may be performed in any order to, for example, bind video planes that are separately generated and sent by TAD stream sources and TAD transmitters and separately received and processed by TAD receivers such that combined frames (including both video planes) are generated and provided to at least one TAD sink for presentment via a display screen; to temporally unbind the video planes to hide low latency user interaction content; to rebind the video planes to reveal low latency user interaction content; and to stop binding the video planes and terminate the TAD receiver and TAD stream sink dedicated to the low latency user interaction content.

Figure 6:
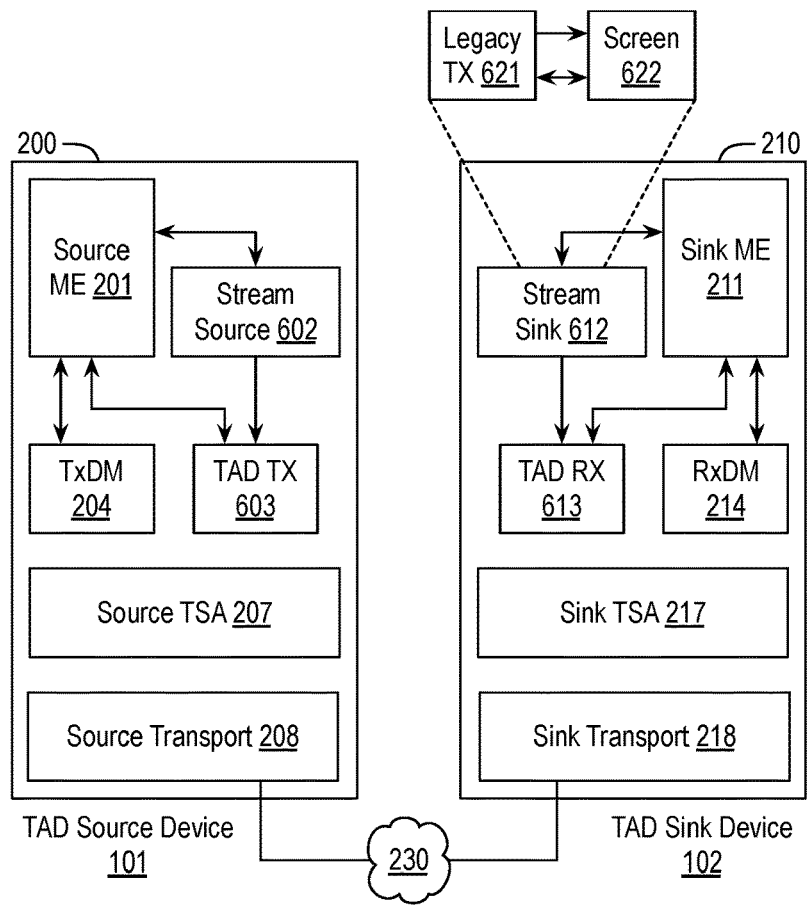
FIG. 6 illustrates another example TAD source device coupled to TAD sink device over example transport topology.

FIG. 6 illustrates another example TAD source device 101 coupled to TAD sink device 102 over example transport topology 230, arranged in accordance with at least some implementations of the present disclosure. As shown in FIG. 6, TAD source device 101 (or at least some components thereof) is implemented via controller 200 and includes source management entity (ME) 201, video stream source 602, TAD device manager (TxDM), a TAD transmitter (TAD TX) 603, source TSA module 207, and source transport module 208. TAD sink device 102 (or at least some components thereof) is implemented via controller 210 and includes sink management entity (ME) 211, a video stream sink 612, TAD device manager (RxDM), a TAD receiver (TAD RX) 613, sink TSA module 217, and sink transport module 218. As shown, stream sink 612 may include a legacy transmitter (TX) module 621 and a display screen 622 such that legacy TX 621 performs reconfiguration of video data, if needed, for presentment via display screen 622. Notably, stream sink 1 212 and or stream sink 2 213 may also implement a legacy TX and/or display screen.

Notably, TAD source device 101 and TAD sink device 102 as illustrated in FIG. 6 each include a single instance of stream source 602, TAD TX 603, stream sink 621, and TAD RX 613. Techniques discussed with respect to TAD source device 101 and TAD sink device 102 as illustrated in FIG. 6 provide for transmission and receipt of multiple video streams (corresponding to multiple video planes) using a single instance of stream source 602, TAD TX 603, stream sink 621, and TAD RX 613. Such techniques may also be performed in the context of TAD source device 101 and TAD sink device 102 as illustrated in FIG. 6 such that a single instance of a stream source (e.g., stream source 1 202), a TAD TX (e.g., TD TX1 205), a stream sink (e.g., stream sink 1 212), and a TAD RX (e.g., TAD RX1 215) perform the operations discussed with respect to stream source 602, TAD TX 603, stream sink 621, and TAD RX 613.

Figure 7:
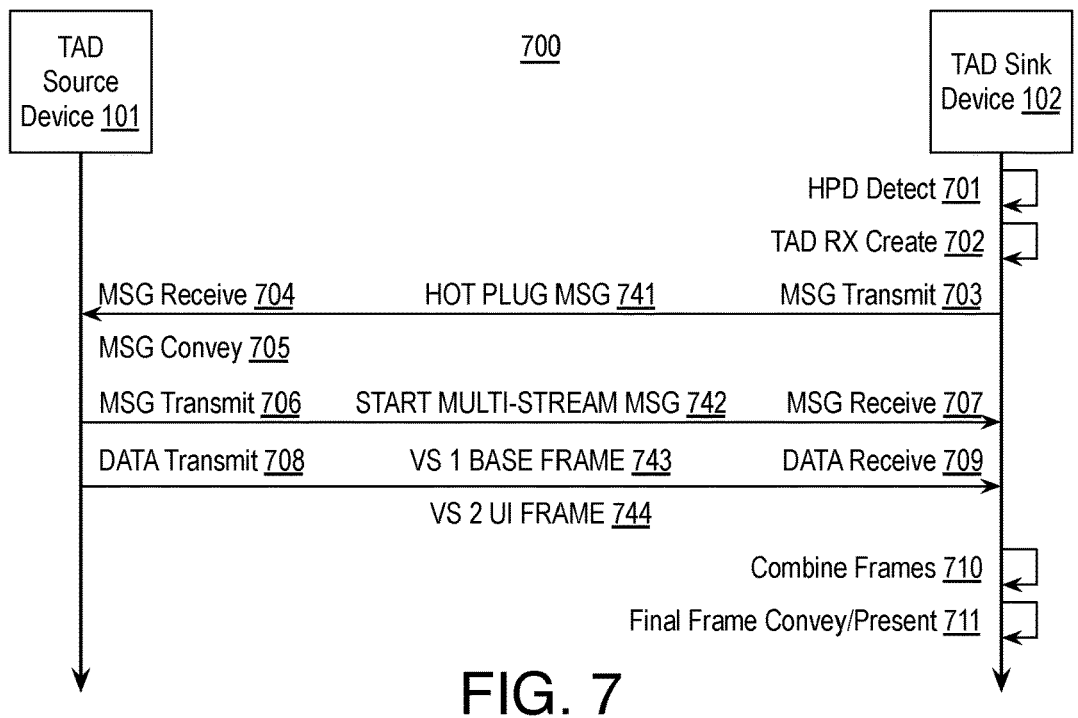
FIG. 7 illustrates an example process for transmitting and receiving separate video streams for base content and user interaction content.

FIG. 7 illustrates an example process 700 for transmitting and receiving separate video streams for base content and user interaction content, arranged in accordance with at least some implementations of the present disclosure. As shown in FIG. 7, TAD source device 101 and TAD sink device 102 interact to present video content to a user. In the discussion of FIG. 7, reference is made to TAD source device 101 coupled to an example TAD sink device 102 and the components thereof to indicate the sub-components of controllers 200, 210 that perform the discussed operations with respect to FIG. 6. As discussed, such operations may also be performed by corresponding components of TAD source device 101 and TAD sink device 102 as illustrated in FIG. 2.

As shown in FIG. 7, TAD sink device 102 may detect a hot plug device at operation 701. In response to the HPD (or any other event to instantiate video display), TAD sink device 102 (e.g., via sink ME 211 and/or RxDM 214) creates TAD RX 613 and assigns a handle to TAD RX 613 at operation 702. Furthermore, TAD sink device 102 (e.g., via sink ME 211) generates a hot plug message 741, which is transmitted by RxDM 214 to TAD source device 110 at operation 703. Hot plug message 741 includes an indication of a capable stream sink. TAD source device 101 receives hot plug message 741 at operation 704 via TxDM 204. TxDM 204 conveys hot plug message 741 to source ME 201. In response thereto, TAD source device 101 (e.g., via source ME 201) generates TAD TX 603 at operation 706.

Processing continues with source ME 201 generating a start stream message 742 indicating multiple separate streams are to be transmitted. Start stream message 742 indicates, for example, a video stream of multiple video streams corresponds to video plane having user interaction content (e.g., includes a cursor). Furthermore, start stream message 742 may indicate another video stream of the multiple video streams corresponds to video plane having base frame content. For example, each video stream may have an identifier or indicator that indicates the video plane of the video stream.

As shown at operation 708, TAD source device 101 initiates data transmission of a video stream 1 including base frames 743 and, separately, of video stream 2 including user interaction frames 744. As discussed with respect to FIG. 3, video stream 1 including base frames 743 includes video data of a first plane that includes base frames and video stream 2 including user interaction frames 744 includes video data of a second plane that includes user interaction content. Although transmitted and received using the same TAD TX and TAD RX instance, such video streams are separate such that the separate video streams, video planes, and video frames are each capable of being processed, transmitted, received, encoded, decoded, etc. to generate video. For example, each of video stream 1 including base frames 743 and video stream 2 including user interaction frames 744 includes data that is separately capable of generating video for presentment to a user. In the embodiment of FIG. 7, video stream 1 including base frames 743 and video stream 2 including user interaction frames 744 are each generated by the same stream sources (stream source 602). In an embodiment, video stream 1 including base frames 743 is encoded to generate a bitstream and TAD TX 603 encrypts and packetizes the bitstream for transport and video stream 2 including user interaction frames 744 is encoded to generate a bitstream and TAD TX 603 encrypts and packetizes the bitstream for transport.

At operation 709, video stream 1 including base frames 743 and video stream 2 including user interaction frames 744 are received by TAD sink device 102. In particular, TAD RX 613 receives video stream 1 including base frames 743 and TAD RX 613 216 receives video stream 2 including user interaction frames 744. TAD RX 613 decrypts and reassembles TAD packets of video stream 1 including base frames 743 to generate a bitstream that is decoded to generate base frames. Furthermore, TAD RX 613 decrypts and reassembles TAD packets of video stream 2 including user interaction frames 744 to generate a bitstream that is to generate user interaction frames. A base frame and a user interaction frame are then combined at operation 710 to generate a composite frame as discussed, for example, with respect to FIG. 5. The composite frame is conveyed to stream sink 271 for presentation via a display screen at operation 711.

As discussed, process 700 provides for a controller to receive, from TAD source device 101 via transport topology 230, a first video stream corresponding to a first video plane such that the first video plane comprises a base frame of composed video content and to receive, from TAD source device 101 via transport topology 230, a second video stream, separate from the first video stream, corresponding to a second video plane such that the second video plane comprises a user interaction frame of user interaction content. In particular, the first and second video streams are both generated by the same stream source, transmitted by the same TAD transmitter, and are both received by the same TAD receiver. The base frame and the user interaction frame are combined to generate a composite frame that is provided to a display screen for presentment to a user. Furthermore, process 300, as discussed above, provides for a controller to receive, from TAD source device 101 via transport topology 230, a first video stream corresponding to a first video plane such that the first video plane comprises a base frame of composed video content and to receive, from TAD source device 101 via transport topology 230, a second video stream, separate from the first video stream, corresponding to a second video plane such that the second video plane comprises a user interaction frame of user interaction content. In particular, the first and second video streams are generated by different stream sources, transmitted by different TAD transmitters, and received by different TAD receivers. The base frame and the user interaction frame are then combined to generate a composite frame that is provided to a display screen for presentment to a user.

Notably, both processes receive separate video streams and combine frames thereof for presentment. Process 300 provides for TAD operations that allow for creation of two instances of a TAD link (each transmitting a single video stream) from a given stream source to a specific stream sink, with one instance being dedicated to a user interaction content (e.g., a cursor) and the other to base frames (e.g., composed content) and to bind and unbind these instances dynamically with individual frames of bound instances combined in the video sink device for presentation. Process 700 provides for TAD operations that transmit multiple individual planes to be transmitted from a given video source device to a given video sink device, which combines the planes (e.g., frames of the plane) with the user interaction content being transmitted as one of the planes. Process 300 and process 700 may be implemented separately or together in a TAD topology. Discussion now turns to operations that are applicable to either process 300 or process 700.

In another embodiment, a user interface frame or image is transmitted over a control plane. In such embodiments, TAD source device 101 generates an update user interface frame or image control message (e.g., an UpdateCursorImage Control Message) that indicates a new user interface frame or image (e.g., of a cursor image) that is to be composed with all base frames received at TAD sink device 102 until another update user interface frame or image control message is transmitted by TAD source device 101 (or a suspend/ stop binding message is received as discussed herein). In such embodiments, a second TAD RX need not be created. Furthermore, in response to the update user interface frame or image control message, TAD sink device 102 generates a bind user interface message (e.g., a BindCursor message) that indicates to TAD source device 101 that RxDM 214 is ready to receive user interface (e.g., cursor) images through the control path and compose the received user interface (e.g., cursor) images with the base frame(s).

Figure 8:
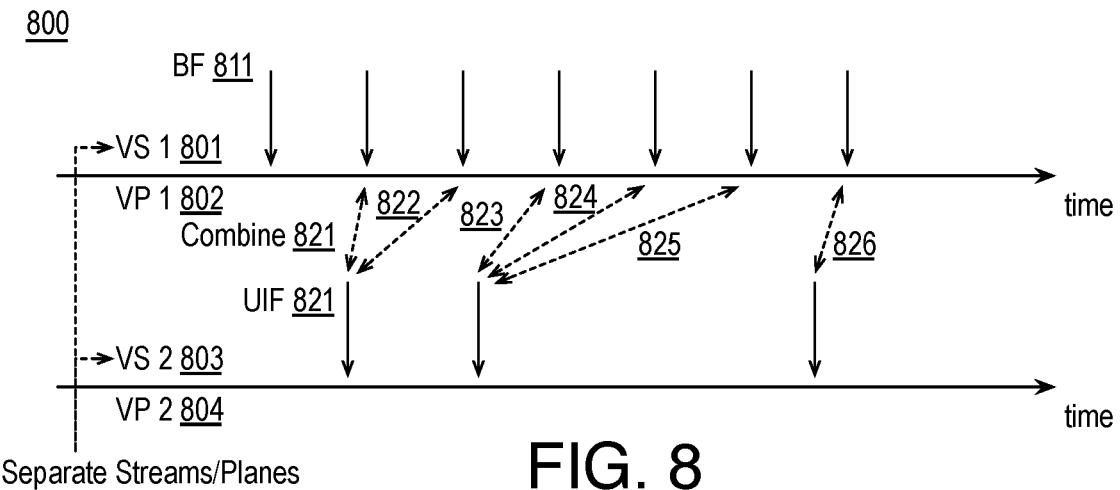
FIG. 8 illustrates an example timing diagram of base frames and user interaction frames.

FIG. 8 illustrates an example timing diagram 800 of base frames 811 and user interaction frames 821, arranged in accordance with at least some implementations of the present disclosure. In the illustrated example, each of base frames (BF) 811 and user interaction frames (UIF) 821 are illustrated as a downward arrow such that the downward arrow indicates a timing the base frame or the user interaction frame is to be presented. As will be appreciated, such timing may be translated to frame encode, encryption, packetization, etc. at TAD source device 101 and de-packetization, decryption, decode, etc. at TAD sink device 102.

As shown in FIG. 8, base frames 811 are part of a video stream 1 801 and a video plane 1 802 and user interaction frames 821 are part of a video stream 2 803 and a video plane 2 804 that are separate from video stream 1 801 and video plane 1 802 as discussed herein. In the example of FIG. 8, base frames 811 are to be presented at a particular frame rate such as 24 fps, 30 fps, 60 fps, etc. and user interaction frames 821 are combined with pertinent frames of base frames 811 as received for presentment at combine operations 821, 822, 823. The combined frames are then presented. Furthermore, when no change to the user interaction content is received (e.g., no interface frame 821 is received), the previous user interaction frame is combined with the current frame of base frames 811 as shown with respect to combine operations 824, 825, 826. Advantageously, a combined frame does not need to be generated at TAD source device 101 and processed by TAD sink device 102 at each time instance, thus saving bandwidth and latency. In particular, user interaction frames 821 may be stored in a first buffer allocation of a memory buffer and base frames 811 may be stored in a second buffer allocation of the memory buffer such that the first buffer allocation is smaller than the second buffer allocation.

In the illustrated embodiment, base frames 811 are at a fixed frame rate and user interaction frames 821 are at an intermittent or ad hoc frame rate. In some embodiments, both base frames 811 and user interaction frames 821 are received at an intermittent or ad hoc rate. For example, a base frame may be stored in a memory buffer allocation (e.g., 1920×1080 pixel buffer allocation for high definition) until a change to the base frame is received, at which time the memory buffer allocation is replaced with the new base frame. Similarly, a user interaction frame (as discussed, a frame may or may not fill an entire display screen) may be stored in another memory buffer allocation (e.g., 64×64 pixel buffer allocation), smaller than the base frame memory buffer allocation, until a change to the user interaction frame is received, at which time the memory buffer allocation of the user interaction frame is updated. Furthermore, at each display screen refresh, the current base frame and the current user interaction frame may be combined to generate a composite frame for presentation via a stream sink (e.g., including a display screen). Notably, using such techniques, TAD source device 101 only needs to send frames at updates, which offers significant processing, power, and bandwidth usage reduction.

Figure 9:
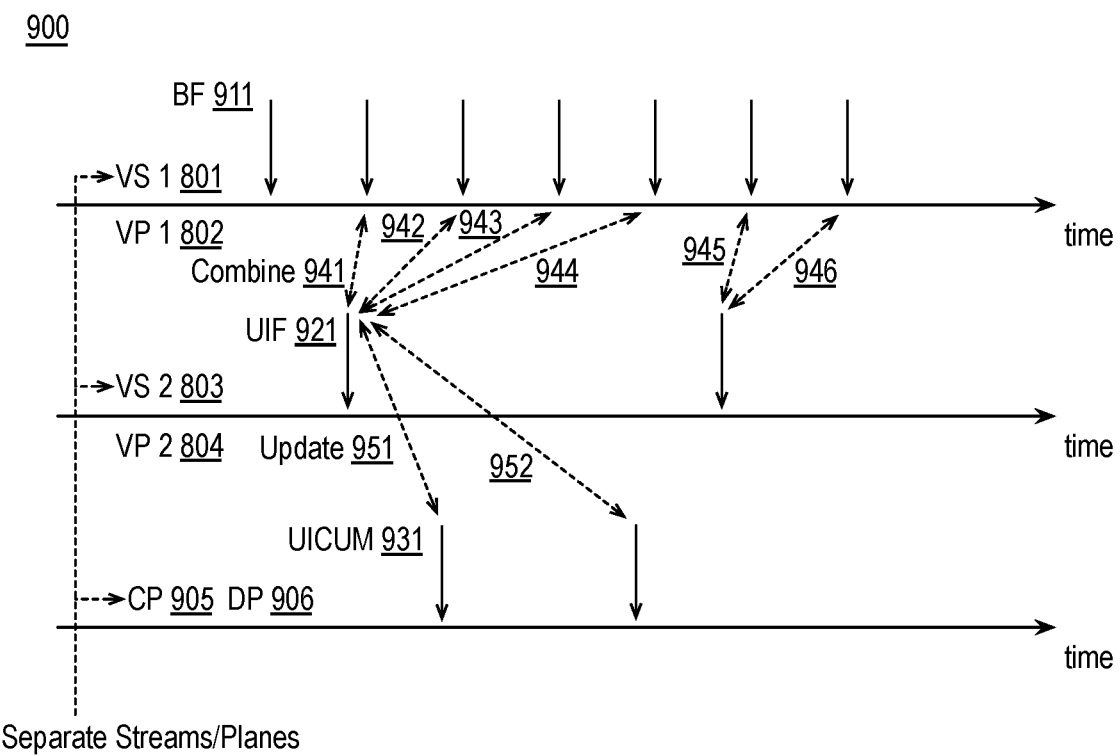
FIG. 9 illustrates example timing diagram of base frames, user interaction frames, user interaction content update messages.

FIG. 9 illustrates an example timing diagram 900 of base frames 911, user interaction frames 921, user interaction content update messages 931, arranged in accordance with at least some implementations of the present disclosure. In the illustrated example, as with FIG. 8, each of base frames (BF) 911, user interaction frames (UIF) 921, and user interaction content update messages (UICUM) 931 are illustrated as a downward arrow such that the downward arrow indicates a timing the base frame, user interaction frame, or user interface update is to be presented or implemented. As will be appreciated, such timing may be translated to, with respect to base frames and user interaction frames, frame encode, encryption, packetization, etc. at TAD source device 101 and de-packetization, decryption, decode, etc. at TAD sink device 102 and, with respect to user interface updates, user interaction content update message generation, encryption, packetization, etc. at TAD source device 101 and receipt, de-packetization, decryption, etc. at TAD sink device 102.

Base frames 911 are part of video stream 1 801 and video plane 1 802 and user interaction frames 921 are part of video stream 2 803 and video plane 2 804 that are separate from video stream 1 801 and video plane 1 802. Furthermore, user interaction content update messages 931 are part of a control plane 905 (or control channel) or a data plane 906, which are also separate from video stream 1 801 and video plane 1 802 and video stream 2 803 and video plane 2 804. In an embodiment, user interaction content update messages 931 are implemented as part of control plane 905 such that user interaction content update messages 931 are decoupled from data plane 906 (which may also include video streams). In an embodiment, user interaction content update messages 931 are implemented as part of data plane but are implemented separately with respect to the video streams. For example, control plane 905 may be used for command messaging including stop video commands, control enablement commands, color space conversion commands and parameters, video scaling commands and parameters, etc. that may support but are separate from video data. Notably, such command data may not be used to generate video or video frames but video streams can be used to generate video or video frames.

As discussed with respect to base frames 811, in the illustrated example, base frames 911 are to be presented at a particular frame rate. Furthermore, user interaction frames 921 are combined with pertinent frames of base frames 911 as received for presentment at combine operation 941. Notably, user interaction frames 921 provide a shape and texture (e.g., pixel data) as well as a location of user interaction content (e.g., a cursor) such that user interaction frames 921 may be used without any other data to form a combined frame that includes user interaction content. The combined frames are then presented via a display screen.

When there is no change to the shape and texture (e.g., pixel data) of the user interface content, but there is change to its location (e.g., a regular occurrence when a cursor or the like is moved) or how it is to be combined with the base frame (e.g., a regular occurrence when a cursor or the like is to pulsate or otherwise change in its presentment), TAD source device 101 generates and transmits a user interaction content update messages 931. User interaction content update messages 931 includes any suitable data to translate the user interaction content to a new location and/or to properly combine the user interaction content with a base fame. In an embodiment, user interaction content update messages 931 includes metadata to translate the user interaction content and/or to control the combination of the user interaction content with a base frame. In an embodiment, user interaction content update messages 931 may be characterized as a cursor metadata packets (CMP). As discussed, user interaction content update messages 931 do not include any video content or data that may be used to generate video or video frames.

In an embodiment, user interaction content update messages 931 include one or more of a user interaction content position (e.g., an upper left location with a frame where the user interaction content is to be combined with a base frame), composition parameters (e.g., alpha blending parameters, XOR blend parameters, etc.), an indicator to indicate whether the user interaction content is to be on (e.g., displayed) or off (e.g., not displayed), or z-ordering and transparency values for multiple video planes 803, 804 or more if implemented. In an embodiment, user interaction content update messages 931 are sent with a null data stream (e.g., payload size of zero) but with a header and presentation timestamp (PTS) such that the header includes the discussed position, composition parameters, and/or on/off indicator and the presentation timestamp indicates a time the user interaction content is to be presented. In an embodiment, the presentation timestamp indicates a frame number for presentation of the user interaction content. In an embodiment, when implemented via control plane 905, user interaction content update messages 931 (e.g., the metadata therein) is associated with a base frame using the frame number of the base frame. In an embodiment, when implemented via data plane 906, user interaction update messages 931 provide updates at the same rate at which the content of base frames 911 changes (e.g., at a particular frame rate). In an embodiment, when implemented via data plane 906, user interaction update messages 931 are provided as an attribute or attributes to the user interaction As shown at update operation 951, TAD sink device 102 uses one of user interaction content update messages 931 to update or modify user interaction frames 921 and/or to modify how combine operation 942 combines the pertinent base frame 911 with user interaction frame 921. For example, the position of user interface content may be adjusted, the combining may be adjusted, or both in response to user interaction content update messages 931. Furthermore, when no change to the user interaction content is received (e.g., no interface frame 921 nor a user interaction content update message 931 is received), the previous user interaction frame as modified by the previous user interaction content update message is combined with the current frame of base frames 811 as shown with respect to combine operation 943.

As shown at update operation 952 and combine operation 944, when another update user interaction content update message is received (but not yet another user interaction frame), TAD sink device 102 uses the most current user interaction content update messages 931 to update or modify user interaction frames 921 and/or to modify how combine operation 942 combines the pertinent base frame 911 with user interaction frame 921. In an embodiment, user interaction content update messages 931 are independent such that all required information for update operation 952 is received. In another embodiment, contiguous user interaction content update messages 931 (e.g., sequential without a user interaction frame update therebetween) provide delta information with respect to the first user interaction content update message such that only data that is changed is transmitted. For example, if the location changes but not the composition parameters, only the location changes are provided (either as a new location or as a shift from the previous location). Similarly, if the composition parameters change but not the location, only the composition parameters are provided When another user interaction frames 921 is received for presentment (e.g., due to the shape and/or texture of the user interaction content changing), the new user interaction frame of interface frames 921 is combined with pertinent base frame of base frames 911 as illustrated with respect to combine operation 945. The combined frame is then presented via a display screen. When no change to the user interaction content is received (e.g., no interface frame is received and no user interaction content update message is received), the previous user interaction frame is combined with the current frame of base frames 911 as shown with respect to combine operations 946. As discussed with respect to FIG. 8, user interaction frames 921 may be stored in a first buffer allocation of a memory buffer and base frames 911 may be stored in a second buffer allocation of the memory buffer such that the first buffer allocation is smaller than the second buffer allocation. Furthermore, user interaction content update messages 931 do not need to be buffered.

In the illustrated embodiment, base frames 911 are at a fixed frame rate and user interaction frames 921 and user interaction content update messages 931 are at an intermittent or ad hoc frame rate. In some embodiments, base frames 911, user interaction frames 821, and user interaction content update messages 931 are all received at intermittent or ad hoc rates. As discussed with respect to FIG. 8, a base frame may be stored in a memory buffer allocation (e.g., 1920×1080 pixel buffer allocation for high definition) until a change to the base frame is received at which time the memory buffer allocation is replaced with the new base frame. Similarly, a user interaction frame (as discussed, a frame may or may not fill an entire display screen) may be stored in another memory buffer allocation (e.g., 64×64 pixel buffer allocation), smaller than the base frame memory buffer allocation, until a change to the user interaction frame is received at which time the memory buffer allocation of the user interaction frame is updated. Furthermore, at each display screen refresh, the current base frame and the current user interaction frame as modified by a current user interaction content update message (if applicable) may be combined using techniques modified by a current user interaction content update message (if applicable) to generate a composite frame for presentation via a stream sink (e.g., including a display screen). Notably, using such techniques, TAD source device 101 only needs to send base frames when frame updates are needed, user interaction frames only when shape or texture changes to the user interaction content are needed, and user interaction content update message when position or combining changes are needed for the user interaction content, which offers significant processing, power, and bandwidth resource usage reduction.

The techniques and systems discussed herein provide for generalized, low latency user interaction with video on a diversity of transports. For example, the described techniques and systems provide a generalized framework (e.g., rather than defining a small, dedicated user interaction or cursor buffer) a second plane is defined that may be utilized for user interaction content (e.g., a cursor) or other content such as multiple applications. Such techniques provide energy, computation, and bandwidth savings and efficiencies. As discussed, in the context of TAD, a video sink device provides storage for each video plane that it supports. In some embodiments, each plane is transmitted only when its content has changed. When content has not changed, the video sink device composes the frame based on locally stored data. Since local copies exist of each frame (base and user interaction), update rates of each frame are decoupled from the others: only the frame that has been changed is transmitted, and only when a change occurs. This advantageously avoids unnecessary data transmission and the associated processing at the video source device and the video sink device. Furthermore, low latency user interaction content (e.g., low latency cursor) is achieved by using a second video plane for the low latency user interaction content, not retransmitting the first plane (e.g., a base frame plane) when it has not changed, and not transmitting the second plane (e.g., user interaction content plane) unless the user interaction content (e.g., cursor) shape has changed. Not transmitting the first plane unless there are changes reduces latency to readiness of a frame compared to full composition approaches (e.g., where the base frame is transmitted at display refresh rate). Not transmitting the second plane unless there is a shape change reduces latency in getting the frame ready since work to be done is further reduced (e.g., when a cursor is moved, the only information to be transmitted is only the cursor position and no other planes). Notably, delays in the path between transmit and process of a video frame data no longer apply to the cursor when the only screen change is related to cursor movement.

Figure 10:
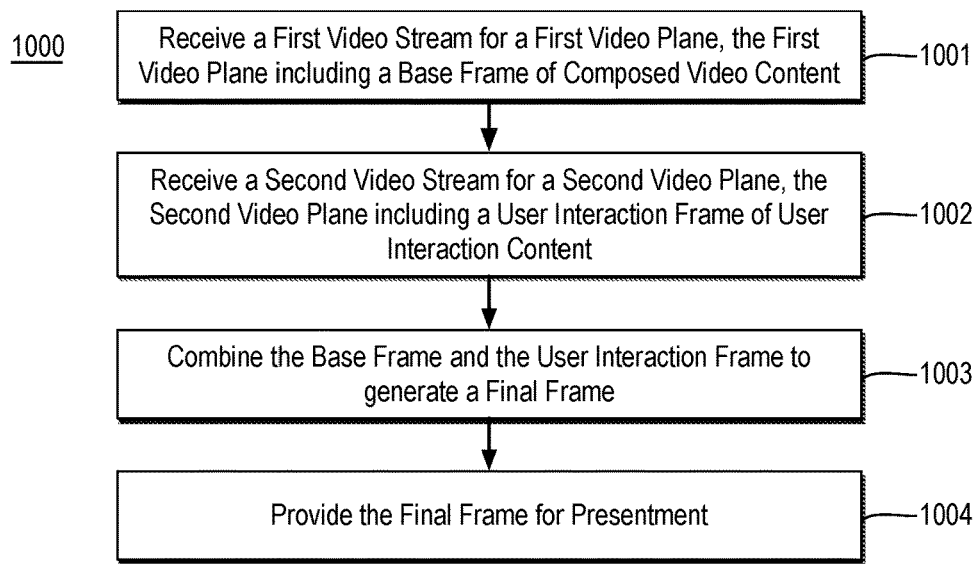
FIG. 10 is a flow diagram illustrating an example process for receiving and presenting video over a diversity of transports.

FIG. 10 is a flow diagram illustrating an example process 1000 for receiving and presenting video over a diversity of transports, arranged in accordance with at least some implementations of the present disclosure. Process 1000 may include one or more operations 1001-1004 as illustrated in FIG. 10. Process 1000 may form at least part of a video presentation process. Furthermore, process 1000 will be described with reference to system 1200 of FIG. 12.

Figure 11:
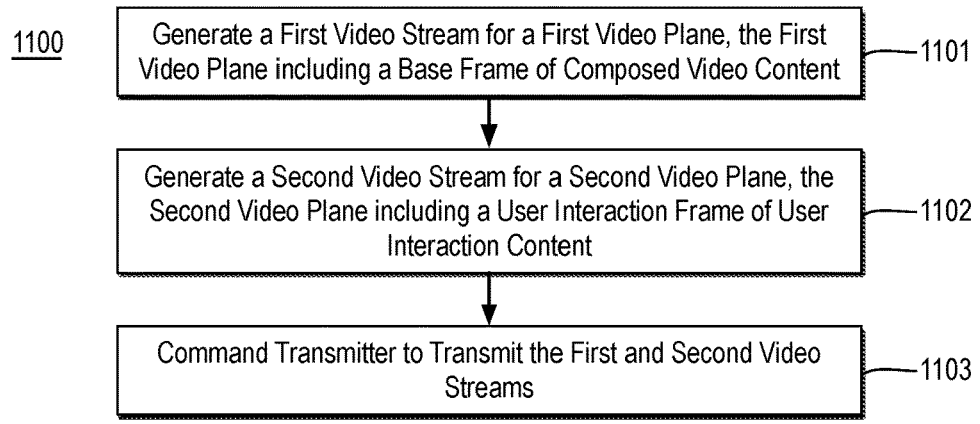
FIG. 11 is a flow diagram illustrating another example process for generating and transmitting video over a diversity of transports.

FIG. 11 is a flow diagram illustrating another example process 1100 for generating and transmitting video over a diversity of transports, arranged in accordance with at least some implementations of the present disclosure. Process 1100 may include one or more operations 1101-1103 as illustrated in FIG. 11. Process 1100 may form at least part of a video transmission process. Furthermore, process 1100 will be described with reference to system 1200 of FIG. 12.

Figure 12:
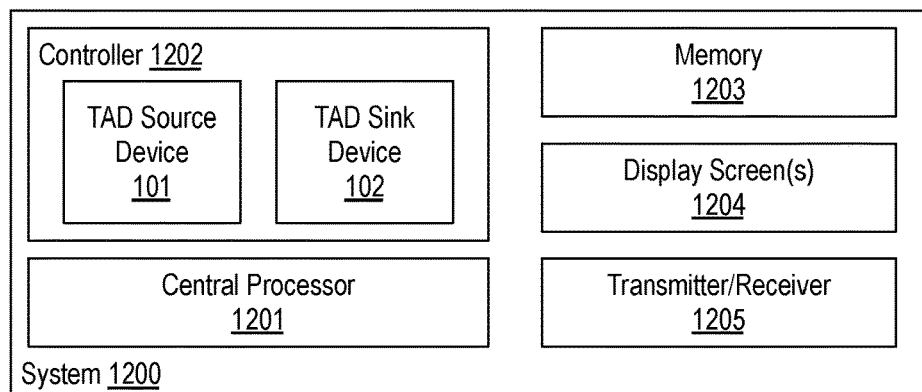
FIG. 12 is an illustrative diagram of an example system for receiving and presenting video and/or generating and transmitting video over a diversity of transports.

FIG. 12 is an illustrative diagram of an example system 1200 for receiving and presenting video and/or generating and transmitting video over a diversity of transports, arranged in accordance with at least some implementations of the present disclosure. For example, system 1200 may perform one or more operations discussed with respect to process 1000, process 1100, or any other operations discussed herein. As shown in FIG. 12, system 1200 may include a central processor 1201, a controller 1202, a memory 1203, one or more display screens 1204, and a transmitter/receiver 1205. In some embodiments system 1200 may not include camera 1204, display 1205, and/or transmitter/receiver 1205. As shown, controller 1202 may implement TAD source device 101 and/or TAD sink device 102. System 1200 may include any system or device discussed herein or combinations thereof. In the example of system 1200, memory 1203 may store video data, messaging data, base frame data, user interaction frame data, or any related data such as any other data discussed herein.

As shown, in some embodiments, one or more or portions of TAD source device 101 and/or TAD sink device 102 may be implemented via controller 1202. In other embodiments, one or more or portions of TAD source device 101 and/or TAD sink device 102 may be implemented via central processor 1201. In yet other embodiments, one or more or portions of TAD source device 101 and/or TAD sink device 102 may be implemented by a video processing unit, a graphics processing unit, an image processing unit, or the like. In some embodiments, motion based color assisted region segmentation system 400 may be implemented in hardware as a system-on-a-chip (SoC).

Controller 1202 may include any number and type of processing units that may provide the operations as discussed herein. Such operations may be implemented via software or hardware or a combination thereof. For example, controller 1202 may include circuitry dedicated to manipulate and/or analyze images or frames obtained from memory 1203. Central processor 1201 may include any number and type of processing units or modules that may provide control and other high level functions for system 1200 and/or provide any operations as discussed herein. Memory 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1203 may be implemented by cache memory. In an embodiment, one or more or portions of TAD source device 101 and/or TAD sink device 102 may be implemented via an execution unit (EU) of controller 1202 or another processor. The EU may include, for example, programmable logic or circuitry such as a logic core or cores that may provide a wide array of programmable logic functions. In an embodiment, one or more or portions of TAD source device 101 and/or TAD sink device 102 may be implemented via dedicated hardware such as fixed function circuitry or the like. Fixed function circuitry may include dedicated logic or circuitry and may provide a set of fixed function entry points that may map to the dedicated logic for a fixed purpose or function. Display 1204 may be any display or device that may present image or frame data. Transmitter/receiver 1206 may include any suitable transmitter and/or receiver that may transmit or receive data as discussed herein.

System 1200 may implement any devices, systems, modules, units, or the like as discussed herein. Furthermore, system 1200 may implement any processes, operations, or the like as discussed herein. System 1200 may have any suitable form factor. For example, system 1200 may be implemented by a camera, a smartphone, an ultrabook, a tablet, a wearable device, a monitor, a desktop computer, a set top box, a gaming console, a television, or the like.

Returning to discussion of FIG. 10, process 1000 may begin at operation 1001, where a first video stream is received from a content source via a transport topology such that the first video stream corresponds to a first video plane and the first video plane includes a base frame of composed video content. For example, the base frame may be suitable to fill a resolution of a display screen and the composed video content may be suitable for presentation with or without user interaction content.

Processing may continue at operation 1002, where a second video stream, separate from the first video stream, is received from the content source via the transport topology such that the second video stream corresponds to a second video plane and the second video plane includes a user interaction frame of user interaction content. For example, the user interaction frame may be a small frame segment (e.g., 16×16 pixels or 32×32 pixels) that includes user interaction content such as a cursor or other user input image.

Processing may continue at operation 1003, where the base frame and the user interaction frame are combined to generate a composite frame. The base frame and the user interaction frame may be combined using any suitable technique or techniques. In an embodiment, the user interaction frame is overlaid onto the base frame. In an embodiment, the user interaction frame and the base frame are blended.

Processing may continue at operation 1004, where the composite frame to a display screen for presentment. For example, the composite frame includes the content of the base frame and the content of the user interaction frame combined in a manner suitable for presentment (e.g., the cursor content and base frame content are portrayed in the composite frame).

In an embodiment, the first video stream is received by a first transport agnostic display compliant receiver implemented by a controller and the second video stream is received by a second (separate) transport agnostic display compliant receiver implemented by the (same) controller. In an embodiment, process 1000 further includes receiving, from the content source via the transport topology, a user interaction bind message to bind the first and second video streams such that the user interaction bind message indicates a first handle of the first transport agnostic display compliant receiver, generating the second transport agnostic display compliant receiver in response to the user interaction bind message, and generating, in response to the bind message, a user interaction bound message indicating a second handle of the second transport agnostic display compliant receiver. In an embodiment, process 1000 further includes receiving, from the content source via the transport topology, a suspend bind message to unbind the first and second video streams such that the unbind message includes the first and second handles and, in response to the suspend bind message, providing a second base frame for presentment such that the second base frame is received via the first video stream and consists of only the first video plane of composed video content (e.g., it does not include user interaction content).

In an embodiment, the first video stream and the second video stream are both received by a (same) transport agnostic display compliant receiver implemented by a controller. In an embodiment, process 1000 further includes receiving, from the content source via the transport topology, a start stream command corresponding to the second video stream such that the start stream command indicates the second video stream includes user interaction content, and the composite frame is generated in response to the start stream command.

In an embodiment, process 1000 further includes receiving, from the content source via the transport topology, a user interaction content update message in a control plane, separate from the first and second video planes, indicating, for a second base frame of the first video plane subsequent to the base frame, at least one of a location within the second frame, a composition parameter, or an on/off indicator for the user interaction frame and generating a second composite frame based on the second base frame, the user interaction frame, and the interaction content update message. In an embodiment, the user interaction content update message comprises the composition parameter and the composition parameter comprises a z-ordering for the first and second video planes and a transparency value for the second video plane.

In an embodiment, process 1000 further includes receiving, from the content source via the transport topology, an update user interface control message over a control plane, transmitting, in response to the update user interface control message, a bind user interface message indicating the controller is prepared to bind a second base frame and a second user interface frame received via the control plane, and composing the second base frame and the second user interface frame received via the control plane to generate a second composite frame.

Process 1000 may be performed in series or at least partially in parallel for any number of video sequences, video instances, or the like.

Turning now to discussion of FIG. 11, process 1100 may begin at operation 1101, where a first video stream corresponding to a first video plane is generated such that the first video plane comprises a base frame of composed video content. For example, the base frame may be suitable to fill a resolution of a display screen and the composed video content may be suitable for presentation with or without user interaction content.

Processing may continue at operation 1102, where a second video stream, separate from the first video stream, is generated such that the second video stream corresponds to a second video plane and the second video plane includes user interaction content. For example, the user interaction frame may be a small frame segment (e.g., 16×16 pixels or 32×32 pixels) that includes user interaction content such as a cursor or other user input image.

Processing may continue at operation 1103, where a command is made to a transmitter to transmit the first and second video streams over a transport topology to a display device. For example, the data transmitted over the transport topology may be agnostic to the transport such that the data may be transmitted over any suitable transport topology type.

In an embodiment, the first video stream is generated by a first transport agnostic display compliant stream source implemented by a controller and the second video stream is generated by a (separate) second transport agnostic display compliant stream source implemented by the (same) controller. In an embodiment, process 1100 further includes determining a user selection of low latency user interface is enabled and providing, over the transport topology to the display device and in response to the user selection of low latency user interface, a user interaction bind message to bind the first and second video streams at the display device such that the user interaction bind message indicates a first handle of a first transport agnostic display compliant receiver of the display device. In an embodiment, process 1100 further includes receiving a user interaction bound message indicating a second handle of a second transport agnostic display compliant receiver of the display device. In an embodiment, process 1100 further includes receiving an indicator that user interaction display is to be suspended and providing, over the transport topology to the display device, a suspend bind message to unbind the first and second video streams, the unbind message comprising the first and second handles.

In an embodiment, the first video stream and the second video stream are both generated by a (same) stream source implemented by the controller. In an embodiment, process 1100 further includes providing, over the transport topology to the display device, a start stream command corresponding to the second video stream such that the start stream command indicates the second video stream includes user interaction content.

In an embodiment, process 1100 further includes providing, over the transport topology to the display device, a user interaction content update message in a control plane, separate from the first and second video planes, indicating, for a second base frame of the first video plane subsequent to the base frame, at least one of a location within the second frame, a composition parameter, or an on/off indicator for the user interaction frame. In an embodiment, the user interaction content update message includes the composition parameter and the composition parameter comprises a z-ordering for the first and second video planes and a transparency value for the second video plane.

Process 1100 may be performed in series or at least partially in parallel for any number of video sequences, video instances, or the like.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
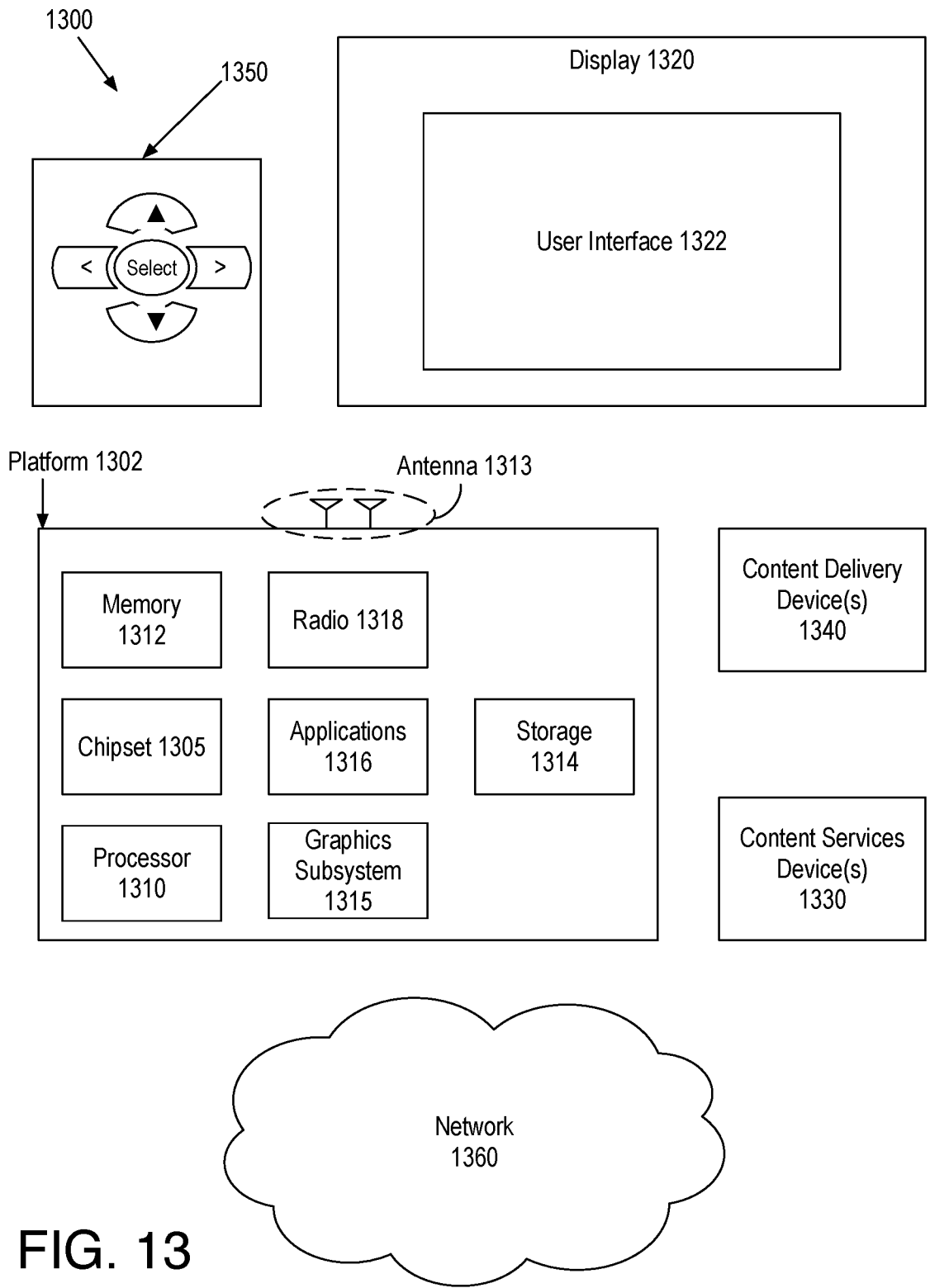
FIG. 13 is an illustrative diagram of an example system.

FIG. 13 is an illustrative diagram of an example system 1300, arranged in accordance with at least some implementations of the present disclosure. System 1300 may perform any operations discussed herein. System 1300 may be incorporated into a personal computer (PC), laptop computer, ultra-laptop computer, tablet, touch pad, portable computer, handheld computer, palmtop computer, gaming console, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of may be used to interact with user interface 1322, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1320) by movements of a pointer, cursor, focus ring, or other visual indicators displayed on the display. For example, under the control of software applications 1316, the navigation features located on navigation may be mapped to virtual navigation features displayed on user interface 1322, for example. In various embodiments, may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
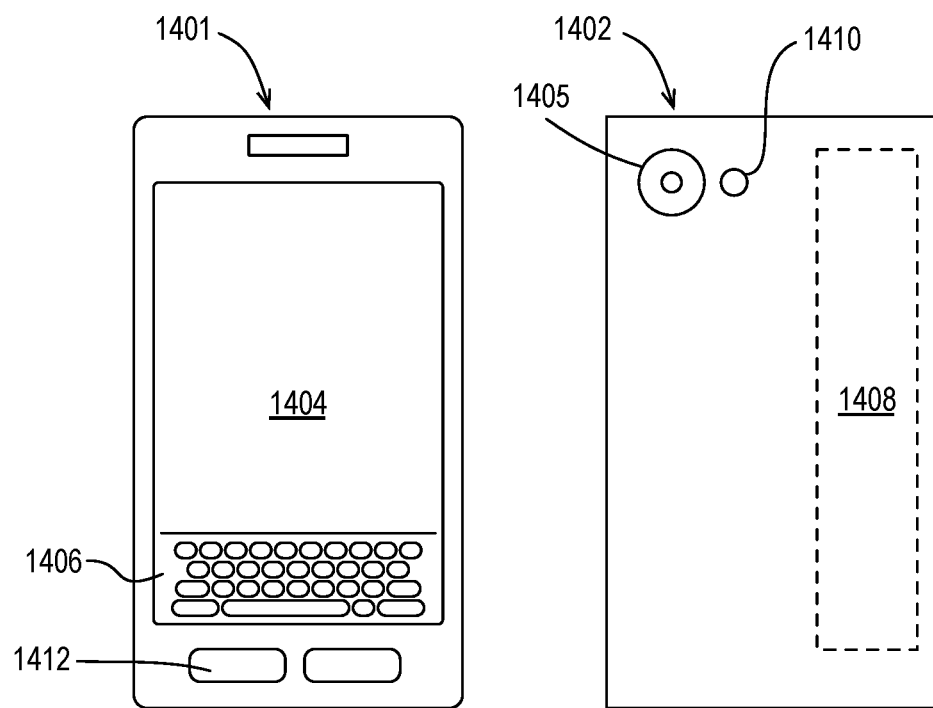
FIG. 14 illustrates an example device, all arranged in accordance with at least some implementations of the present disclosure.

As described above, system 1300 may be embodied in varying physical styles or form factors such as motor vehicle platform form factors or computing platform form factors. FIG. 14 illustrates an example small form factor device 1400, arranged in accordance with at least some implementations of the present disclosure. In some examples, system 1300 may be implemented via device 1400. In other examples, system 100 or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include a camera 1405 (e.g., including a lens, an aperture, and an imaging sensor) and a flash 1410 integrated into back 1402 (or elsewhere) of device 1400. In other examples, camera 1405 and flash 1410 may be integrated into front 1401 of device 1400 or both front and back cameras may be provided. Camera 1405 and flash 1410 may be components of a camera module to originate image data processed into streaming video that is output to display 1404 and/or communicated remotely from device 1400 via antenna 1408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A display device comprising:
a display screen to present video; and
a controller coupled to the display screen, the controller to:
 receive, from a content source via a transport topology, a first video stream corresponding to a first video plane, wherein the first video plane comprises first and second base frames of composed video content, a second video stream, separate from the first video stream, corresponding to a second video plane, wherein the second video plane comprises a user interaction frame of user interaction content, and a user interaction content update message in a control plane, separate from the first and second video planes, to indicate, for the second base frame, subsequent to the first base frame, a location for the user interaction frame within the second base frame and a composition parameter for the user interaction frame within the second base frame;
 combine the base frame and the user interaction frame to generate a first composite frame;
 combine the second base frame and the user interaction frame based on the location for the user interaction frame within the second base frame and the composition parameter for the user interaction frame within the second base frame to generate a second composite frame; and
 provide the first and second composite frames to the display screen for presentment.

2. The display device of claim 1, wherein the first video stream is received by a first transport agnostic display compliant receiver implemented by the controller and the second video stream is received by a second transport agnostic display compliant receiver implemented by the controller.

3. The display device of claim 2, the controller to:
receive, from the content source via the transport topology, a user interaction bind message to bind the first and second video streams, the user interaction bind message indicating a first handle of the first transport agnostic display compliant receiver;
generate the second transport agnostic display compliant receiver in response to the user interaction bind message; and
generate, in response to the user interaction bind message, a user interaction bound message indicating a second handle of the second transport agnostic display compliant receiver.

4. The display device of claim 3, the controller to:
receive, from the content source via the transport topology, a suspend bind message to unbind the first and second video streams, the unbind message comprising the first and second handles; and
in response to the suspend bind message, provide a third received base frame, subsequent to the second base frame, to the display screen for presentment without the user interaction frame, the third received base frame received via the first video stream and consisting of only the first video plane of composed video content.

5. The display device of claim 1, wherein the first video stream and the second video stream are both received by a transport agnostic display compliant receiver implemented by the controller, the controller to:
receive, from the content source via the transport topology, a start stream command corresponding to the second video stream, the start stream command indicating the second video stream comprises user interaction content, wherein composite frame is generated in response to the start stream command.

6. The display device of claim 1, the controller to:
combine the user interaction frame with a third base frame subsequent to the second base frame, in response to no second user interaction content update message and no second user interaction frame being received for implementation in the third base frame, based on the location for the user interaction frame within the second base frame and the composition parameter for the user interaction frame within the second base frame to generate a second composite frame;
combine the user interaction frame with a fourth base frame subsequent to the third base frame, in response to a third user interaction content update message being received for implementation in the fourth base frame, based on a second location and a second composition parameter of the third user interaction content update message; and
combine a third user interaction frame and a fifth base frame subsequent to the fourth base frame in response to the third user interaction frame being received for implementation in the fourth base frame.

7. The display device of claim 1, wherein the composition parameter comprises a z-ordering for the first and second video planes and the user interaction content update message further comprises a transparency value for the second video plane.

8. The display device of claim 1, the controller to:
receive, from the content source via the transport topology, an update user interface control message over a control plane;
transmit, in response to the update user interface control message, a bind user interface message indicating the controller is prepared to bind a third base frame and a second user interface frame received via the control plane; and
compose the second base frame and the second user interface frame received via the control plane to generate a second composite frame.

9. The display device of claim 1, further comprising:
a memory buffer coupled to the controller, the memory buffer comprising a first buffer allocation of not less than a 1920×1080 pixel buffer allocation for the first video plane and a second buffer allocation of not more than a 64×64 pixel allocation, wherein the content source and the display panel operate in accordance with a Transport Agnostic Display (TAD) protocol.

10. A source device comprising:
a transmitter; and
a controller coupled to the transmitter, the controller to:
generate a first video stream corresponding to a first video plane, wherein the first video plane comprises first and second base frames of composed video content, a second video stream, separate from the first video stream, corresponding to a second video plane, wherein the second video plane comprises a user interaction frame of user interaction content to be combined with the first base frame, and a user interaction content update message in a control plane, separate from the first and second video planes, to indicate, for the second base frame, subsequent to the first base frame, a location for the user interaction frame within the second base frame and a composition parameter for the user interaction frame within the second base frame; and
command the transmitter to transmit the first and second video streams and the control plane over a transport topology to a display device.

11. The source device of claim 10, wherein the first video stream is generated by a first transport agnostic display compliant stream source implemented by the controller and the second video stream is generated by a second transport agnostic display compliant stream source implemented by the controller.

12. The source device of claim 11, the controller to:
determine a user selection of low latency user interface is enabled; and
provide, over the transport topology to the display device and in response to the user selection of low latency user interface, a user interaction bind message to bind the first and second video streams at the display device, the user interaction bind message indicating a first handle of a first transport agnostic display compliant receiver of the display device.

13. The source device of claim 12, the controller to:
receive a user interaction bound message indicating a second handle of a second transport agnostic display compliant receiver of the display device; and
provide, over the transport topology to the display device, a bind handles message indicating the display device is to bind the first and second handles.

14. The source device of claim 13, the controller to:
receive an indicator that user interaction display is to be suspended; and
provide, over the transport topology to the display device, a suspend bind message to unbind the first and second video streams, the unbind message comprising the first and second handles.

15. The source device of claim 10, wherein the first video stream and the second video stream are both generated by a stream source implemented by the controller, the controller to:
provide, over the transport topology to the display device, a start stream command corresponding to the second video stream, the start stream command indicating the second video stream comprises user interaction content.

16. The source device of claim 10, the controller to:
generate and transmit a third base frame subsequent to the second base frame, wherein in response to no change in the location and composition parameter with respect to the user interaction frame in the second base frame, no second user interaction content update message is generated for the third base frame;
generate and transmit a fourth base frame subsequent to the third base frame and a third user interaction content update message for implementation of the user interaction frame in the fourth base frame, based on a second location and a second composition parameter of the third user interaction content update message; and
generate and transmit a fifth base frame subsequent to the fourth base frame and a third user interaction frame for implementation in the fifth base frame.

17. The source device of claim 10, wherein the composition parameter comprises a z-ordering for the first and second video planes and the user interaction content update message further comprises a transparency value for the second video plane.

18. At least one non-transitory machine readable medium comprising a plurality of instructions that, in response to being executed on a computing device, cause the computing device to:
receive, from a content source via a transport topology, a first video stream corresponding to a first video plane, wherein the first video plane comprises first and second base frames of composed video content, a second video stream, separate from the first video stream, corresponding to a second video plane, wherein the second video plane comprises a user interaction frame of user interaction content, and a user interaction content update message in a control plane, separate from the first and second video planes, to indicate, for the second base frame, subsequent to the first base frame, a location for the user interaction frame within the second base frame and a composition parameter for the user interaction frame within the second base frame;
combine the base frame and the user interaction frame to generate a first composite frame;
combine the second base frame and the user interaction frame based on the location for the user interaction frame within the second base frame and the composition parameter for the user interaction frame within the second base frame to generate a second composite frame; and
provide the first and second composite frames to the display screen for presentment.

19. The non-transitory machine readable medium of claim 18, wherein the first video stream is received by a first transport agnostic display compliant receiver and the second video stream is received by a second transport agnostic display compliant receiver, the machine readable medium further comprising a plurality of instructions that, in response to being executed on the computing device, cause the computing device to:
receive, from the content source via the transport topology, a user interaction bind message to bind the first and second video streams, the user interaction bind message indicating a first handle of the first transport agnostic display compliant receiver;
generate the second transport agnostic display compliant receiver in response to the user interaction bind message; and
generate, in response to the user interaction bind message, a user interaction bound message indicating a second handle of the second transport agnostic display compliant receiver.

20. The non-transitory machine readable medium of claim 18, wherein the first video stream and the second video stream are both received by a transport agnostic display compliant receiver, the machine readable medium further comprising a plurality of instructions that, in response to being executed on the computing device, cause the computing device to:
receive, from the content source via the transport topology, a start stream command corresponding to the second video stream, the start stream command indicating the second video stream comprises user interaction content, wherein composite frame is generated in response to the start stream command.

21. The non-transitory machine readable medium of claim 18, further comprising a plurality of instructions that, in response to being executed on the computing device, cause the computing device to:
combine the user interaction frame with a third base frame subsequent to the second base frame, in response to no second user interaction content update message and no second user interaction frame being received for implementation in the third base frame, based on the location for the user interaction frame within the second base frame and the composition parameter for the user interaction frame within the second base frame to generate a second composite frame;
combine the user interaction frame with a fourth base frame subsequent to the third base frame, in response to a third user interaction content update message being received for implementation in the fourth base frame, based on a second location and a second composition parameter of the third user interaction content update message; and
combine a third user interaction frame and a fifth base frame subsequent to the fourth base frame in response to the third user interaction frame being received for implementation in the fourth base frame.

22. At least one non-transitory machine readable medium comprising a plurality of instructions that, in response to being executed on a computing device, cause the computing device to:
generate a first video stream corresponding to a first video plane, wherein the first video plane comprises first and second base frames of composed video content, a second video stream, separate from the first video stream, corresponding to a second video plane, wherein the second video plane comprises a user interaction frame of user interaction content to be combined with the first base frame, and a user interaction content update message in a control plane, separate from the first and second video planes, to indicate, for the second base frame, subsequent to the first base frame, a location for the user interaction frame within the second base frame and a composition parameter for the user interaction frame within the second base frame; and
generate a command for a transmitter to transmit the first and second video streams and the control plane over a transport topology to a display device.

23. The non-transitory machine readable medium of claim 22, wherein the first video stream is generated by a first transport agnostic display compliant stream source and the second video stream is generated by a second transport agnostic display compliant stream source, the machine readable medium further comprising a plurality of instructions that, in response to being executed on the computing device, cause the computing device to:
determine a user selection of low latency user interface is enabled; and
provide, over the transport topology to the display device and in response to the user selection of low latency user interface, a user interaction bind message to bind the first and second video streams at the display device, the user interaction bind message indicating a first handle of a first transport agnostic display compliant receiver of the display device.

24. The non-transitory machine readable medium of claim 22, further comprising a plurality of instructions that, in response to being executed on the computing device, cause the computing device to:

receive an indicator that user interaction display is to be suspended; and provide, over the transport topology to the display device, a suspend bind message to unbind the first and second video streams, the unbind message comprising the first and second handles.

25. The non-transitory machine readable medium of claim 22, further comprising a plurality of instructions that, in response to being executed on the computing device, cause the computing device to:

generate a third base frame subsequent to the second base frame, wherein in response to no change in the location and composition parameter with respect to the user interaction frame in the second base frame, no second user interaction content update message is generated for the third base frame;

generate a fourth base frame subsequent to the third base frame and a third user interaction content update message for implementation of the user interaction frame in the fourth base frame, based on a second location and a second composition parameter of the third user interaction content update message; and generate a fifth base frame subsequent to the fourth base frame and a third user interaction frame for implementation in the fifth base frame.

* * * * *